(12) United States Patent
Shibata

(10) Patent No.: US 9,225,901 B2
(45) Date of Patent: Dec. 29, 2015

(54) IMAGE CAPTURING APPARATUS, CONTROL METHOD THEREOF, AND STORAGE MEDIUM

(71) Applicant: Canon Kabushiki Kaisha, Tokyo (JP)

(72) Inventor: Masahiro Shibata, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/138,843

(22) Filed: Dec. 23, 2013

(65) Prior Publication Data

US 2014/0184837 A1    Jul. 3, 2014

(30) Foreign Application Priority Data

Dec. 27, 2012    (JP) .................................. 2012-286168

(51) Int. Cl.
    *H04N 5/232*          (2006.01)

(52) U.S. Cl.
     CPC ....... *H04N 5/23267* (2013.01); *H04N 5/23258* (2013.01); *H04N 5/23287* (2013.01); *H04N 5/23248* (2013.01); *H04N 5/23264* (2013.01)

(58) Field of Classification Search
     USPC ............................ 348/208.99–208.16, 222.1, 348/240.99–240.3, 241, 333.01–333.13, 348/335, 345–357; 382/254–275; 396/52–55, 72–88
See application file for complete search history.

(56) References Cited

U.S. PATENT DOCUMENTS

| | | | | |
|---|---|---|---|---|
| 5,109,249 A | * | 4/1992 | Kitajima | 396/53 |
| 5,649,237 A | * | 7/1997 | Okazaki | 396/55 |
| 7,554,578 B2 | * | 6/2009 | Molgaard | 348/231.3 |
| 7,634,178 B2 | * | 12/2009 | Washisu | 396/53 |
| 7,907,205 B2 | * | 3/2011 | Okada | 348/345 |
| 8,023,809 B2 | * | 9/2011 | Washisu et al. | 396/55 |
| 8,400,516 B2 | * | 3/2013 | Yamada et al. | 348/208.7 |
| 8,477,201 B2 | * | 7/2013 | Washisu | 348/208.99 |
| 8,605,159 B2 | * | 12/2013 | Nishiyama | 348/208.5 |

(Continued)

FOREIGN PATENT DOCUMENTS

| | | |
|---|---|---|
| JP | 2006-071743 A | 3/2006 |
| JP | 2009-124597 A | 6/2009 |

(Continued)

OTHER PUBLICATIONS

Takeshi Watanabe, U.S. Appl. No. 14/138,878, filed Dec. 23, 2013.

*Primary Examiner* — Michael Osinski
(74) *Attorney, Agent, or Firm* — Carter, DeLuca, Farrell & Schmidt, LLP

(57) ABSTRACT

An image capturing apparatus includes an image capturing unit, a focal length detection unit, a shake detection unit, a translation correction amount calculation unit configured to calculate a correction amount of image blurring in a translation direction, a rotation correction amount calculation unit configured to calculate a correction amount of image blurring of the captured image in a rotation direction, a perspective correction amount calculation unit configured to calculate a correction amount for correcting a perspective component out of image deformations, an image stabilization unit configured to correct image blurring of the captured image, and a control unit configured to control to restrict correction of the image blurring in the rotational and perspective directions based on focal length information, and correct much more the image blurring in the translation direction.

26 Claims, 11 Drawing Sheets

(56) References Cited

U.S. PATENT DOCUMENTS

| | | | |
|---|---|---|---|
| 8,629,910 B2 | 1/2014 | Miyasako | |
| 8,803,983 B2* | 8/2014 | Miyazawa | 348/208.11 |
| 8,811,809 B2* | 8/2014 | Miyazawa | 396/55 |
| 8,873,942 B2* | 10/2014 | Wakamatsu | 396/55 |
| 2002/0051634 A1* | 5/2002 | Sato | 396/52 |
| 2004/0085464 A1* | 5/2004 | Higurashi et al. | 348/241 |
| 2009/0167911 A1 | 7/2009 | Takane | |
| 2010/0013937 A1* | 1/2010 | Washisu et al. | 348/208.2 |
| 2010/0079604 A1* | 4/2010 | Washisu | 348/208.4 |
| 2010/0141799 A1 | 6/2010 | Yamashita et al. | |
| 2011/0013896 A1* | 1/2011 | Kawahara | 396/55 |
| 2011/0157381 A1 | 6/2011 | Miyasako | |
| 2012/0014681 A1* | 1/2012 | Miyahara et al. | 396/55 |
| 2012/0033092 A1* | 2/2012 | Sugaya | 348/208.1 |
| 2012/0033954 A1* | 2/2012 | Wakamatsu | 396/55 |
| 2012/0092511 A1* | 4/2012 | Wakamatsu | 348/208.2 |
| 2012/0093493 A1* | 4/2012 | Wakamatsu | 396/55 |
| 2012/0293674 A1* | 11/2012 | Uenaka | 348/208.99 |
| 2013/0004150 A1* | 1/2013 | Wakamatsu | 396/55 |
| 2013/0162847 A1* | 6/2013 | Miyazawa | 348/208.1 |
| 2013/0163084 A1* | 6/2013 | Miyazawa | 359/554 |
| 2013/0163972 A1* | 6/2013 | Miyazawa | 396/55 |
| 2014/0063271 A1* | 3/2014 | Ogura et al. | 348/208.1 |
| 2014/0063272 A1* | 3/2014 | Tsuchida et al. | 348/208.2 |
| 2014/0063279 A1* | 3/2014 | Ogura et al. | 348/222.1 |
| 2014/0071303 A1* | 3/2014 | Hasegawa | 348/208.11 |
| 2014/0085494 A1* | 3/2014 | Tsuchiya et al. | 348/208.1 |
| 2014/0111658 A1* | 4/2014 | Watanabe et al. | 348/208.1 |
| 2014/0111659 A1* | 4/2014 | Miyasako et al. | 348/208.1 |
| 2014/0111661 A1* | 4/2014 | Watanabe et al. | 348/208.6 |
| 2014/0146191 A1* | 5/2014 | Tsuchiya et al. | 348/208.2 |
| 2014/0184836 A1* | 7/2014 | Watanabe | 348/208.5 |
| 2014/0327789 A1* | 11/2014 | Tsuchiya et al. | 348/208.11 |

FOREIGN PATENT DOCUMENTS

| | | |
|---|---|---|
| JP | 2011-029735 A | 2/2011 |
| JP | 2011-146260 A | 7/2011 |

* cited by examiner

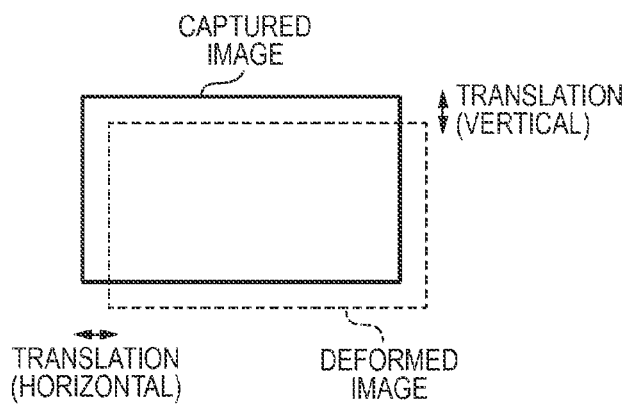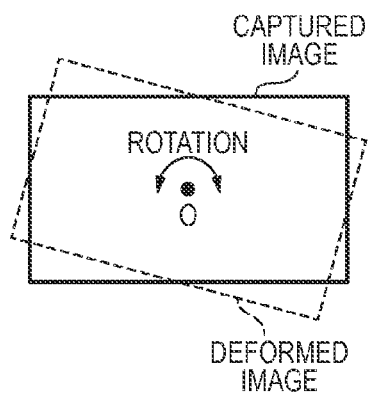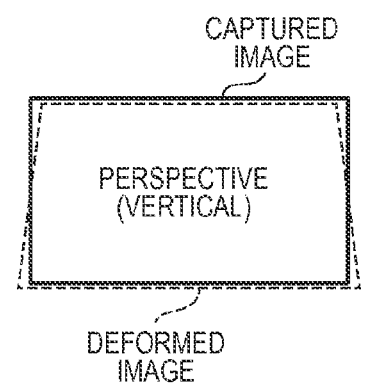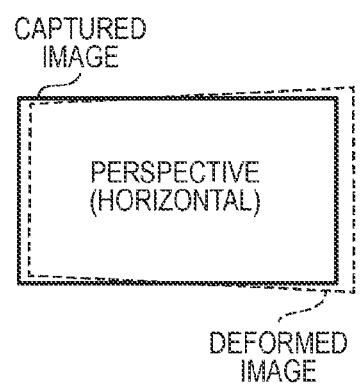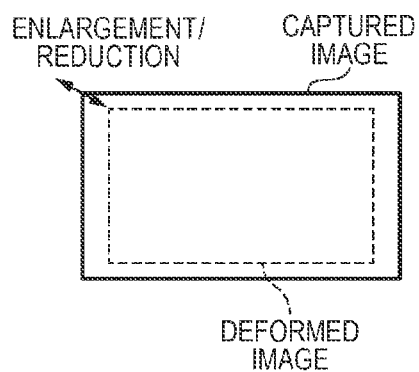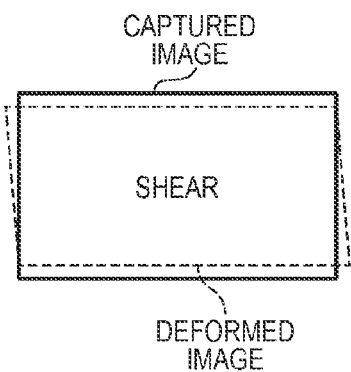

PRIOR ART

IMAGE CAPTURING APPARATUS, CONTROL METHOD THEREOF, AND STORAGE MEDIUM

BACKGROUND OF THE INVENTION

1. Field of the Invention

The present invention relates to a technique of correcting image blurring of a captured image arising from a shake of an image capturing apparatus by using a method of deforming an image in the image capturing apparatus.

2. Description of the Related Art

In recent years, an image stabilization function has become popular along with the development of a technique of correcting a shake acting on an image capturing apparatus. The image stabilization function corrects not only image blurring of a captured image caused by a camera shake when a user is in a still state, but also image blurring of a captured image generated in shooting while the user is walking. When the user shoots an image while walking, the following image blurring is generated in the captured image, in addition to image blurring of the captured image in the horizontal and vertical directions. Examples are image blurring in which a captured image rotates owing to rotation of the image capturing apparatus about the optical axis, and image blurring in which a captured image is distorted into a trapezoidal shape owing to a tilt of the image capturing apparatus with respect to an object.

As a method of correcting various kinds of image blurring generated in a captured image in shooting while walking, there is known a method of calculating the image deformation amount of a captured image and deforming the image to cancel the image deformation amount (see Japanese Patent Laid-Open No. 2011-029735).

Since rotational image blurring about the optical axis and trapezoidal distortion image blurring caused by a perspective greatly stand out on the wide angle side but are hardly conspicuous on the telephoto-side, the effect of correction is little. For this reason, there is also proposed a method of permitting correction of rotational image blurring on the wide angle side with respect to the boundary of a given focal length and inhibiting it on the telephoto-side (see Japanese Patent Laid-Open No. 2006-071743).

In the technique disclosed in Japanese Patent Laid-Open No. 2011-029735, the amount of deformation generated in a captured image owing to a shake acting on the image capturing apparatus is decomposed into deformation components of translation (horizontal/vertical), perspective (horizontal/vertical), enlargement/reduction, rotation, and shear. Filtering processing and the like are then performed for the respective deformation components, and a projective transformation matrix (homography matrix) is calculated. However, this method has the following problems.

More specifically, in the technique disclosed in Japanese Patent Laid-Open No. 2011-029735, since a correction amount is calculated for each deformation component mentioned above, the calculation amount becomes very large and processing becomes complicated. When a shake is large, if all the deformation components are corrected, a finally outputtable image range may become narrow, resulting in poor image quality.

For example, FIG. 11 shows an example of image stabilization by image deformation when the image capturing apparatus rotates about the optical axis. An outer solid-line portion in FIG. 11 indicates a captured image. To correct rotation about the optical axis, the captured image is rotated about an image center O. The rotation of the captured image about the image center O results in a dotted-line image in FIG. 11. At this time, if an output image has the same range as that of the captured image, the image has no data at the four corners. To prevent this, the output image range becomes a hatched region in FIG. 11. Although correction of rotation about the optical axis has been exemplified in FIG. 11, it is necessary to ensure, for each of the remaining deformation components, an image region (to be defined as extra pixels hereinafter) which cannot be output for deformation component. For this reason, the image range becomes narrow, and it becomes difficult to maintain the quality of video after performing image stabilization.

Especially when horizontal and vertical translation image blurs of a captured image are generated by a camera shake, the amount of motion on the image becomes larger as the focal length becomes larger. To capture an unblurred image by correcting the horizontal and vertical translation image blurs, a larger correction amount is required on the telephoto-side than on the wide angle side, and a larger number of extra pixels need to be ensured for that.

A technique disclosed in Japanese Patent Laid-Open No. 2006-071743 considers only still image shooting and does not consider moving image shooting, as in a video camera. Thus, the following problems arise.

More specifically, in a method of switching, with respect to the boundary of a given focal length, whether to correct rotational image blurring, rotational image blurring is corrected on the wide angle side with respect to the boundary of this focal length and is not corrected on the telephoto-side. When zooming is performed in moving image shooting, rotational image blurring suddenly appears with respect to the boundary of the focal length.

Further, when a zoom key is arranged to operate it in a direction perpendicular to the optical axis, the zooming operation readily causes rotational image blurring.

SUMMARY OF THE INVENTION

The present invention has been made in consideration of the above problems, and provides an image capturing apparatus which can suppress degradation of the quality of video and obtain a satisfactory image stabilization effect even in moving image shooting accompanied by zooming.

According to the first aspect of the present invention, there is provided an image capturing apparatus having a function of correcting image blurring of a captured image, comprising: an image capturing unit configured to capture an image; a focal length detection unit configured to detect information of a focal length of an optical system; a shake detection unit configured to detect a shake; a correction amount calculation unit configured to calculate, based on an output from the shake detection unit, a correction amount of image blurring of the captured image in a translation direction, a correction amount of image blurring of the captured image in a rotational direction, and a correction amount for correcting a perspective component of image blurring of the captured image; an image stabilization unit configured to correct image blurring of the captured image based on the correction amount of the image blurring of the captured image in the translation direction, the correction amount of the image blurring of the captured image in the rotational direction, and the correction amount for correcting the perspective component of image blurring of the captured image; and a control unit configured to control to restrict the correction amount of the image blurring of the captured image in the rotational direction and the correction amount of the perspective component of the image blurring of the captured image on a telephoto-side of the focal length, compared to a wide angle side of the focal length, and increase the correction amount of the image blurring of the captured image in the translation direction.

According to the second aspect of the present invention, there is provided a method of controlling an image capturing apparatus having a function of correcting image blurring of a captured image, comprising: an image capturing step of capturing an image; a focal length detection step of detecting information of a focal length of an optical system; a shake detection step of detecting a shake; a correction amount calculation step of calculating, based on an output from the shake detection step, a correction amount of image blurring of the captured image in a translation direction, a correction amount of image blurring of the captured image in a rotational direction, and a correction amount for correcting a perspective component of image blurring of the captured image; an image stabilization step of correcting image blurring of the captured image based on the correction amount of the image blurring of the captured image in the translation direction, the correction amount of the image blurring of the captured image in the rotational direction, and the correction amount for correcting the perspective component of image blurring of the captured image; and a control step of controlling to restrict the correction amount of the image blurring of the captured image in the rotational direction and the correction amount of the perspective component of the image blurring of the captured image on a telephoto-side of the focal length, compared to a wide angle side of the focal length, and increase the correction amount of the image blurring of the captured image in the translation direction.

Further features of the present invention will become apparent from the following description of exemplary embodiments with reference to the attached drawings.

BRIEF DESCRIPTION OF THE DRAWINGS

FIGS. 10A to 10F are views for explaining the definition of "image blurring" in the embodiments of the present invention.

DESCRIPTION OF THE EMBODIMENTS

Embodiments of the present invention will now be described in detail with reference to the accompanying drawings.

Figure 9A:
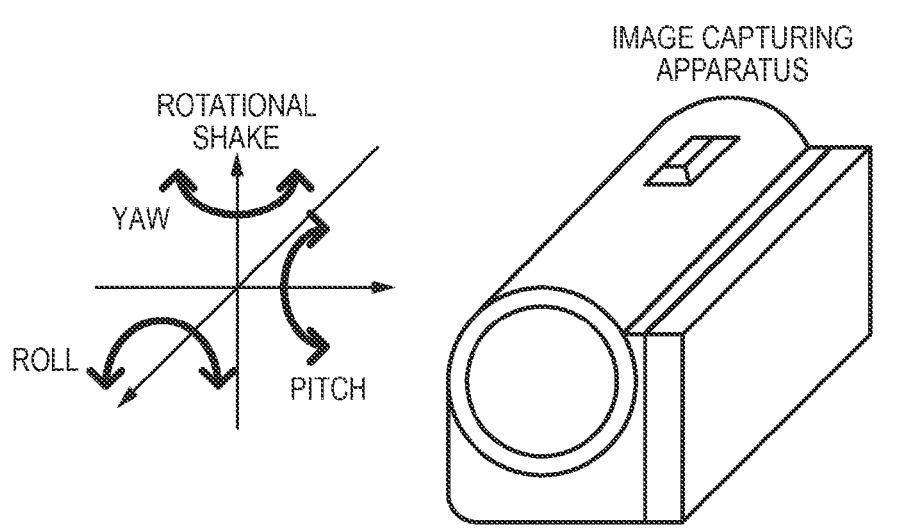
FIGS. 9A and 9B are views for explaining the definition of "shake" in the embodiments of the present invention.
Figure 9B:
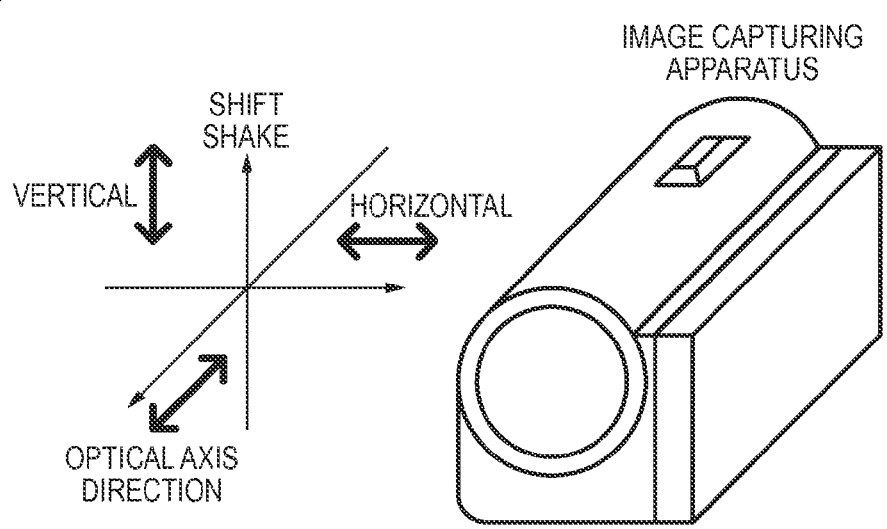
Figure 11:
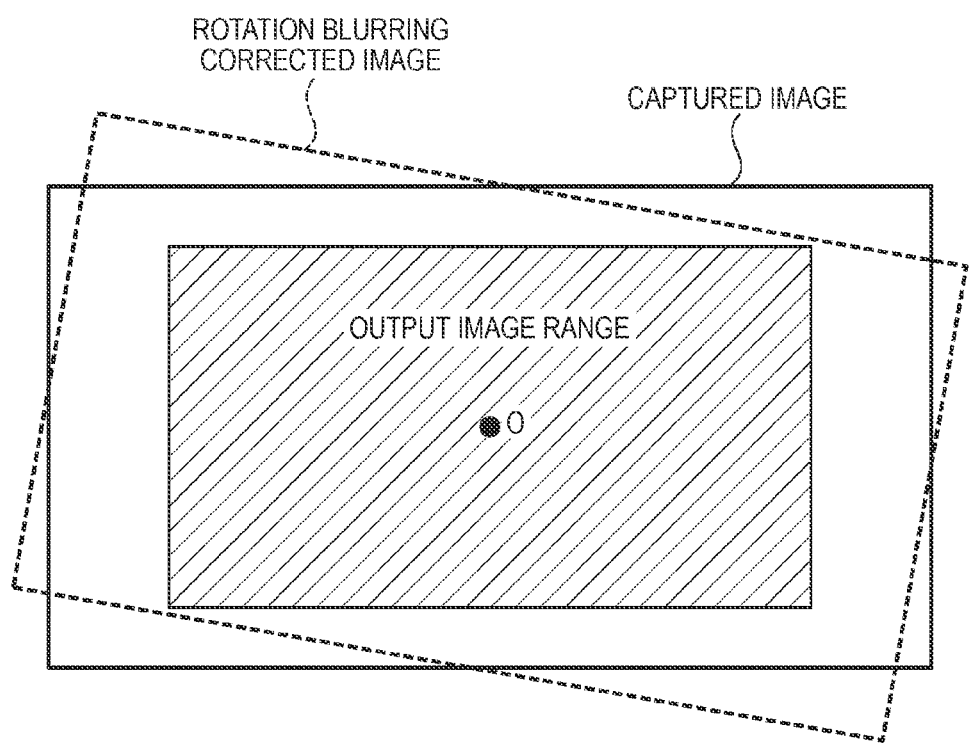
FIG. 11 is a view for explaining conventional problems.

First, the definitions of terms used in the embodiments of the present invention will be explained. In the description of the embodiments of the present invention, "shake" is movement acting on an image capturing apparatus, and "image blurring" is deformation of a captured image caused by a shake acting on the image capturing apparatus. In the embodiments of the present invention, "shake" generically means three "rotational shakes" in the yaw, pitch, and roll directions, and three "translational shakes" (shift shakes) in the horizontal, vertical, and optical axis directions, as shown in FIGS. 9A and 9B. On the other hand, "image blurring" generically means deformation components of translation (horizontal/vertical), rotation, perspective (horizontal/vertical), enlargement/reduction, and shear, as shown in FIGS. 10A to 10F.

First Embodiment

Figure 1:
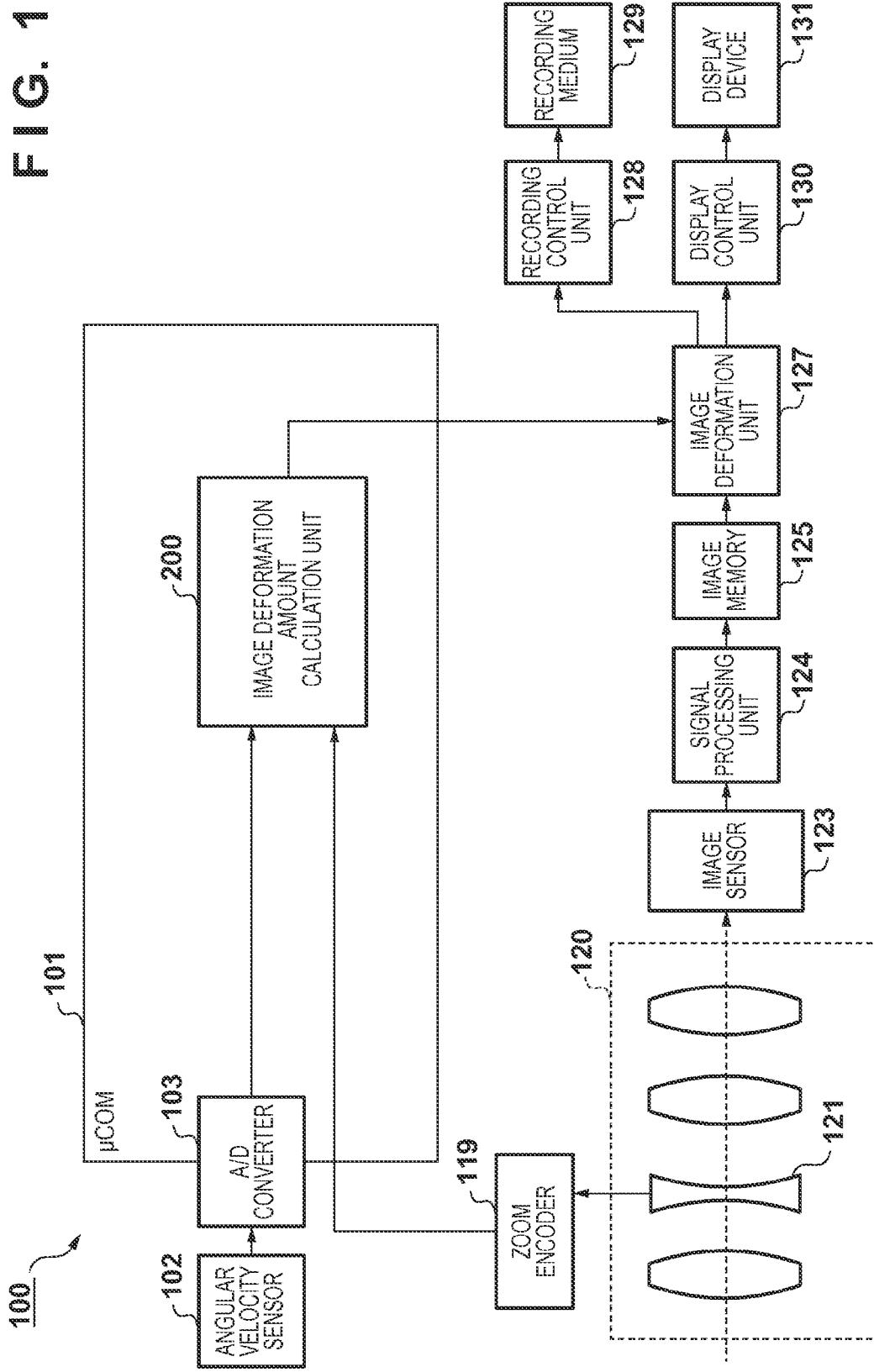
FIG. 1 is a block diagram showing an example of the arrangement of a video camera as an example of an image capturing apparatus in the first embodiment of the present invention.

FIG. 1 is a block diagram showing the arrangement of a video camera as an example of an image capturing apparatus according to the first embodiment of the present invention. The building components of an image capturing apparatus 100 shown in FIG. 1 and an example of its operation will be described in detail below.

An angular velocity sensor 102 detects a shake acting on the image capturing apparatus 100 as an angular velocity signal, and supplies the angular velocity signal to an A/D converter 103. The A/D converter 103 converts the angular velocity signal from the angular velocity sensor 102 into a digital signal, and supplies it as angular velocity data to an image deformation amount calculation unit 200 in a μCOM 101.

An imaging optical system 120 performs an operation such as zooming by movement of a zoom lens or focusing by movement of a focus lens, and forms an object image on an image sensor 123. A zoom encoder 119 serving as a focal length detection means detects the position (zoom position) of a zoom optical system 121 in the imaging optical system 120, and outputs it to the image deformation amount calculation unit 200 in the μCOM 101.

The image deformation amount calculation unit 200 calculates an image deformation amount for correcting image blurring of a captured image by using the angular velocity data and an output from the zoom encoder 119, and sets the calculated image deformation amount in an image deformation unit 127. Details of processing by the image deformation amount calculation unit 200 will be described later.

The image sensor 123 converts the object image formed by the imaging optical system 120 into an electrical signal serving as a captured image signal, and supplies it to a signal processing unit 124. The signal processing unit 124 is a circuit which processes a captured image signal, and is formed from an analog signal processing circuit and digital signal processing circuit. The analog signal processing circuit generates an analog image capturing signal by performing predetermined processing for a signal obtained by the image sensor 123. The analog signal processing circuit is formed from, for example, a CDS (Co-related Double Sampling) circuit and AGC (Automatic Gain Control) circuit. The digital signal processing circuit converts an analog image capturing signal into a digital signal by using an A/D converter, and generates a digital video signal having undergone predetermined signal processes such as gamma correction and white balance adjustment. Further, the digital signal processing circuit converts the digital video signal into a video signal complying with a format such as NTSC or PAL, and supplies it to an image memory 125.

The image deformation unit 127 corrects image blurring of the captured image by deforming the image stored in the image memory 125 based on the image deformation amount calculated by the image deformation amount calculation unit 200, and outputs the corrected image to a recording control unit 128 and a display control unit 130. The display control unit 130 outputs the video signal supplied from the image deformation unit 127 and causes a display device 131 to display the image. The display control unit 130 drives the display device 131. The display device 131 displays the image by a liquid crystal display element (LCD or viewfinder) or the like.

If recording of a video signal is designated via an operation unit (not shown) used to instruct the start or end of recording, the recording control unit 128 outputs a video signal supplied from the image deformation unit 127 to a recording medium 129, and records it on the recording medium 129. The recording medium 129 is an information recording medium such as a semiconductor memory, or a magnetic recording medium such as a hard disk or magnetic tape.

The image deformation unit 127 performs image deformation using geometric transformation such as projective transformation. More specifically, (X0, Y0) are pixel coordinates in an image before deformation (an image stored in the image memory 125) (note that the center of the captured image corresponding to the optical axis of the imaging optical system 120 is set as the origin). (X1, Y1) are pixel coordinates in an image (an output image from the image deformation unit 127) after deformation. In this case, image deformation can be represented by a homogeneous coordinate system, as given by:

$$\begin{bmatrix} X1 \\ Y1 \\ 1 \end{bmatrix} \sim \begin{bmatrix} h1 & h2 & h3 \\ h4 & h5 & h6 \\ h7 & h8 & 1 \end{bmatrix} \begin{bmatrix} X0 \\ Y0 \\ 1 \end{bmatrix} \quad (1)$$

The left and right sides of expression (1) have an equivalence relation (even if the left or right side is multiplied by an arbitrary magnification, the meaning remains unchanged). If the normal equal sign is used, expression (1) is rewritten into:

$$X1 = \frac{h1 X0 + h2 Y0 + h3}{h7 X0 + h8 Y0 + 1} \quad (2)$$

$$Y1 = \frac{h4 X0 + h5 Y0 + h6}{h7 X0 + h8 Y0 + 1} \quad (3)$$

In expression (1), the 3×3 matrix is generally called a projective transformation matrix. The image deformation amount calculation unit 200 sets elements h1 to h8 of the matrix. In the following description, the image deformation unit 127 performs image deformation by using projective transformation. However, any deformation method such as affine transformation may be used.

Next, details of processing to be performed by the image deformation amount calculation unit 200 will be described. The image deformation amount calculation unit 200 calculates the image deformation amount of the image deformation unit 127 by using a shake angle of the image capturing apparatus calculated from an output from the angular velocity sensor 102, and a focal length of the imaging optical system 120 calculated by the zoom encoder 119. More specifically, the projective transformation matrix in expression (1) is calculated.

A method of calculating the projective transformation matrix using the shake angle and the focal length of the imaging optical system 120 will be described below.

Figure 2A:
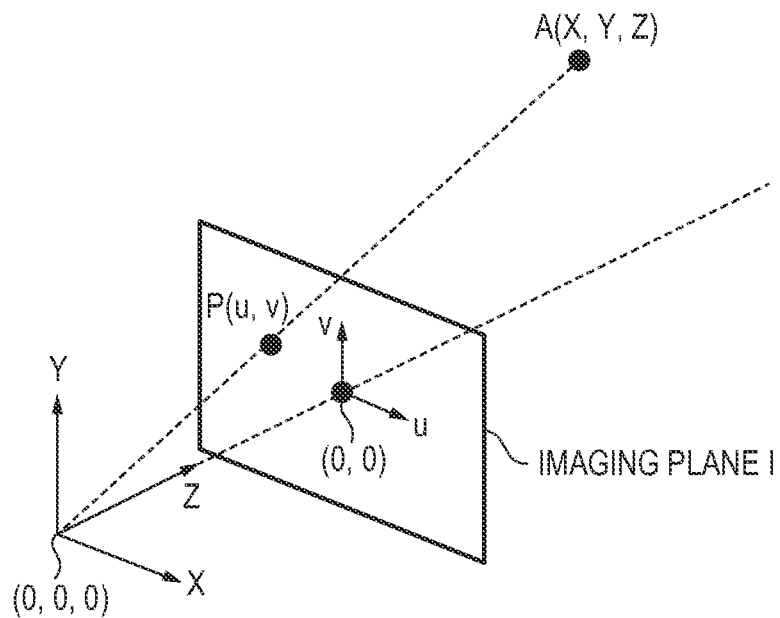
FIGS. 2A and 2B are views for explaining a pinhole camera model.

FIG. 2A shows projection of an object image on an imaging plane by the image capturing apparatus by using a pinhole camera model. Referring to FIG. 2A, the origin (0, 0, 0) of the XYZ space coordinate system corresponds to a pinhole position in the pinhole camera model. If the imaging plane is arranged behind the pinhole position, an image projected on the imaging plane is inverted. In FIG. 2A, therefore, an imaging plane I is virtually arranged in front of the pinhole position so that the image is not inverted and is thus easily handled.

The distance in the Z-axis direction between the origin (0, 0, 0) of the XYZ space coordinate system and the imaging plane I is a focal length f. Coordinates on the imaging plane I are defined as uv plane coordinates. Assume that the origin (0, 0) of the uv plane coordinate system coincides with (0, 0, f) in the XYZ space coordinate system. A coordinate point P(u, v) in the uv plane coordinate system represents a coordinate point obtained when an object position A(X, Y, Z) in the XYZ space coordinate system is projected on the imaging plane I. At this time, the coordinate point P is given by:

$$\begin{bmatrix} u \\ v \end{bmatrix} = \begin{bmatrix} f \dfrac{X}{Z} \\ f \dfrac{Y}{Z} \end{bmatrix} \quad (4)$$

Using a homogeneous coordinate system, equation (4) can be rewritten into:

$$\begin{bmatrix} u \\ v \\ 1 \end{bmatrix} \sim \begin{bmatrix} f & 0 & 0 & 0 \\ 0 & f & 0 & 0 \\ 0 & 0 & 1 & 0 \end{bmatrix} \begin{bmatrix} X \\ Y \\ Z \\ 1 \end{bmatrix} \quad (5)$$

Elements in the fourth column of the 3×4 matrix in expression (5) remain 0 in the description of this embodiment, and thus expression (5) reduces to:

$$\begin{bmatrix} u \\ v \\ 1 \end{bmatrix} \sim \begin{bmatrix} f & 0 & 0 \\ 0 & f & 0 \\ 0 & 0 & 1 \end{bmatrix} \begin{bmatrix} X \\ Y \\ Z \end{bmatrix} \quad (6)$$

Figure 2B:
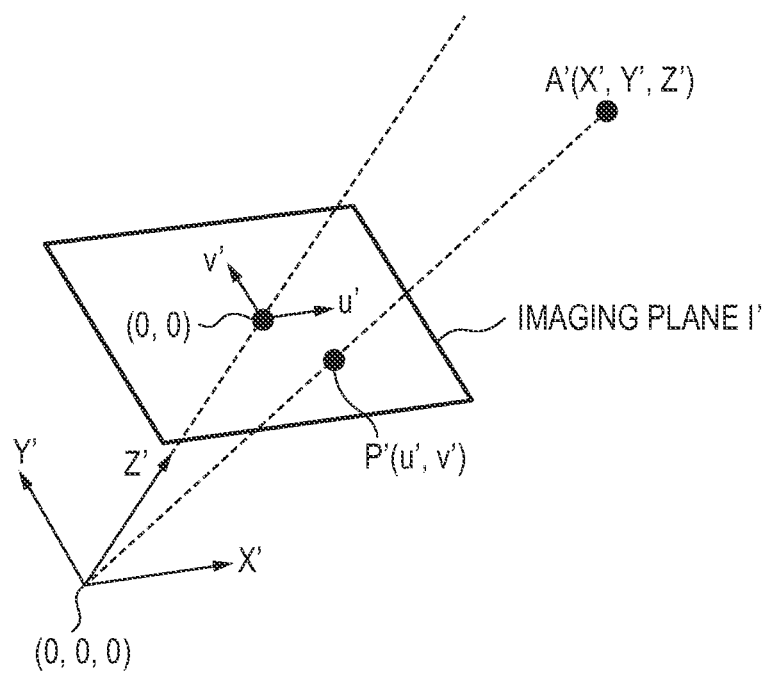

FIG. 2B shows a pinhole camera model obtained by rotating the pinhole camera model shown in FIG. 2A by R. FIG. 2B shows an X'Y'Z' space coordinate system obtained by rotating the XYZ space coordinate system shown in FIG. 2A by R. Assume that the origin (0, 0, 0) of the X'Y'Z' space coordinate system coincides with that of the XYZ space coordinate system. That is, FIG. 2B simply shows, by using a pinhole camera mode, a state in which a rotational shake R is generated in the third direction serving as the direction of the shooting optical axis, but a translational shake, which is parallel movement of the image capturing apparatus, is not generated in the image capturing apparatus.

In the pinhole camera model of FIG. 2B, an imaging plane I' is arranged at a distance of the focal length f from the origin (0, 0, 0), as in FIG. 2A. Coordinates on the imaging plane I' are defined as u'v' plane coordinates. Assume that the origin (0, 0) of the u'v' plane coordinate system coincides with (0, 0, f) in the X'Y'Z' space coordinate system. A coordinate point P'(u', v') in the u'v' plane coordinate system represents a coordinate point obtained when an object position A'(X', Y', Z') in the X'Y'Z' space coordinate system is projected on the imaging plane I'. Note that the object A in FIG. 2A and the object A' in FIG. 2B are at the same position in the world coordinate system (that is, the object stays still). Like expression (6), using the homogeneous coordinate system, the coordinate point P' is given by:

$$\begin{bmatrix} u' \\ v' \\ 1 \end{bmatrix} \sim \begin{bmatrix} f & 0 & 0 \\ 0 & f & 0 \\ 0 & 0 & 1 \end{bmatrix} \begin{bmatrix} X' \\ Y' \\ Z' \end{bmatrix} \quad (7)$$

The objects A and A' are at the same position in the world coordinate system, and thus the relationship between the coordinate points of the objects A and A' is given by:

$$\begin{bmatrix} X' \\ Y' \\ Z' \end{bmatrix} = R \begin{bmatrix} X \\ Y \\ Z \end{bmatrix} \quad (8)$$

Modification of expressions (6) and (7), and substitution of them into equation (8) yield:

$$\begin{bmatrix} u' \\ v' \\ 1 \end{bmatrix} \sim \begin{bmatrix} f & 0 & 0 \\ 0 & f & 0 \\ 0 & 0 & 1 \end{bmatrix} R \begin{bmatrix} f & 0 & 0 \\ 0 & f & 0 \\ 0 & 0 & 1 \end{bmatrix}^{-1} \begin{bmatrix} u \\ v \\ 1 \end{bmatrix} \quad (9)$$

Expression (9) indicates the correspondence between the positions of the object images on the imaging plane before and after the pinhole camera is rotated by R. That is, expression (9) represents the movement of the position of a pixel on the imaging plane when a shake of rotation by R acts on the image capturing apparatus. Therefore, to correct image blurring, it is only necessary to perform conversion to cancel the pixel movement amount when a shake acts on the image capturing apparatus. That is, it is only necessary to perform conversion to return, to the original position, a pixel position which has moved when a shake of rotation by R acts on the image capturing apparatus, given by:

$$\begin{bmatrix} u \\ v \\ 1 \end{bmatrix} \sim \begin{bmatrix} f & 0 & 0 \\ 0 & f & 0 \\ 0 & 0 & 1 \end{bmatrix} R^{-1} \begin{bmatrix} f & 0 & 0 \\ 0 & f & 0 \\ 0 & 0 & 1 \end{bmatrix}^{-1} \begin{bmatrix} u' \\ v' \\ 1 \end{bmatrix} \quad (10)$$

Let R be a shake acting on the image capturing apparatus 100 shown in FIG. 1, f be the focal length of the imaging optical system 120, and H be the projective transformation matrix for image stabilization. Then, H is given by:

$$H = \begin{bmatrix} f & 0 & 0 \\ 0 & f & 0 \\ 0 & 0 & 1 \end{bmatrix} R^{-1} \begin{bmatrix} f & 0 & 0 \\ 0 & f & 0 \\ 0 & 0 & 1 \end{bmatrix}^{-1} \quad (11)$$

Note that $\theta_y$ is a rotational shake amount acting on the image capturing apparatus in the yaw direction, which is a shake in the first direction on a plane perpendicular to the optical axis. $\theta_p$ is a rotational shake amount in the pitch direction, which is a shake in the second direction perpendicular to the first direction on the plane perpendicular to the optical axis. $\theta_r$ is a rotational shake amount in the roll direction. In this case, R is given by:

$$R = \begin{bmatrix} \cos\theta_y & 0 & -\sin\theta_y \\ 0 & 1 & 0 \\ \sin\theta_y & 0 & \cos\theta_y \end{bmatrix} \begin{bmatrix} 1 & 0 & 0 \\ 0 & \cos\theta_p & -\sin\theta_p \\ 0 & \sin\theta_p & \cos\theta_p \end{bmatrix} \begin{bmatrix} \cos\theta_r & -\sin\theta_r & 0 \\ \sin\theta_r & \cos\theta_r & 0 \\ 0 & 0 & 1 \end{bmatrix} \quad (12)$$

H of equation (11) can be decomposed into deformation components of translation $\vec{t}$, enlargement/reduction s (constant), rotation r (matrix), shear k (matrix), perspective $\vec{v}$ by using:

$$H = \begin{bmatrix} sr & \vec{t} \\ \vec{0}^t & 1 \end{bmatrix} \begin{bmatrix} k & \vec{0} \\ \vec{0}^t & 1 \end{bmatrix} \begin{bmatrix} I & \vec{0} \\ \vec{v}^t & 1 \end{bmatrix} \quad (13)$$

$$r = \begin{bmatrix} \cos\theta & -\sin\theta \\ \sin\theta & \cos\theta \end{bmatrix}, \vec{t} = \begin{bmatrix} t_x \\ t_y \end{bmatrix}, k = \begin{bmatrix} \alpha & \tan\phi \\ 0 & 1 \end{bmatrix}, \vec{v} = \begin{bmatrix} v_x \\ v_y \end{bmatrix},$$

$$I = \begin{bmatrix} 1 & 0 \\ 0 & 1 \end{bmatrix}, \vec{0} = \begin{bmatrix} 0 \\ 0 \end{bmatrix}$$

where
tx . . . horizontal translation amount
ty . . . vertical translation amount
θ . . . rotation angle
vx . . . horizontal perspective amount
vy . . . vertical perspective amount
α . . . anisotropic magnification of shear
φ . . . directional angle of shear Solving the equation of each deformation component using equations (11), (12), and (13) yields:

$$t_x = f(\tan\theta_y \cos\theta_r/\cos\theta_p + \tan\theta_p \sin\theta_r) \quad (14)$$

$$t_y = f(-\tan\theta_y \sin\theta_r/\cos\theta_p + \tan\theta_p \cos\theta_r) \quad (15)$$

$$\theta = -\theta_r \quad (16)$$

$$v_x = -\tan\theta_y/f \quad (17)$$

$$v_y = -\tan\theta_p/(f\cos\theta_y) \quad (18)$$

$$s = (\cos\theta_y \cos\theta_p)^{-3/2} \quad (19)$$

$$\alpha = (\cos\theta_p/\cos\theta_y)^{1/2} \quad (20)$$

$$\tan\phi = \sin\theta_y \sin\theta_p/(\cos\theta_y \cos\theta_p)^{1/2} \quad (21)$$

When γ represents the angle of a shake acting on the image capturing apparatus, if its value is not so large, cos γ=1, sin γ tan γ=0, and sin γ sin γ=0 are obtained by approximation. In this case, equations (14) to (21) can be approximated by:

$$t_x = f\tan\theta_y \quad (22)$$

$$t_y = f\tan\theta_p \quad (23)$$

$$\theta = -\theta_r \quad (24)$$

$$v_x = -\tan\theta_y/f \quad (25)$$

$$v_y = -\tan\theta_p/f \quad (26)$$

$$s = 1 \quad (27)$$

$$\alpha = 1 \quad (28)$$

$$\tan\phi = 0 \quad (29)$$

The building components of the image deformation amount calculation unit 200 and an example of its operation according to this embodiment will be described in detail below with reference to the block diagram of FIG. 3. Note that a rotational shake in the yaw direction causes a horizontal translation movement and horizontal perspective in accordance with equations (22) and (25). A rotational shake in the pitch direction causes a vertical translation movement and vertical perspective in accordance with equations (23) and (26). Processes for these two rotational shakes are the same, so only control in one of the pitch and yaw directions will be explained.

In this embodiment, assume that the image deformation unit 127 performs image deformation without using the shear and enlargement/reduction components out of the deformation components of image deformation. Hence, neither the shear nor enlargement/reduction component is illustrated in the arrangement of FIG. 3. However, it may be configured to perform image deformation for the shear and enlargement/reduction components according to equations (19) to (21) or equations (27) to (29).

Figure 3:
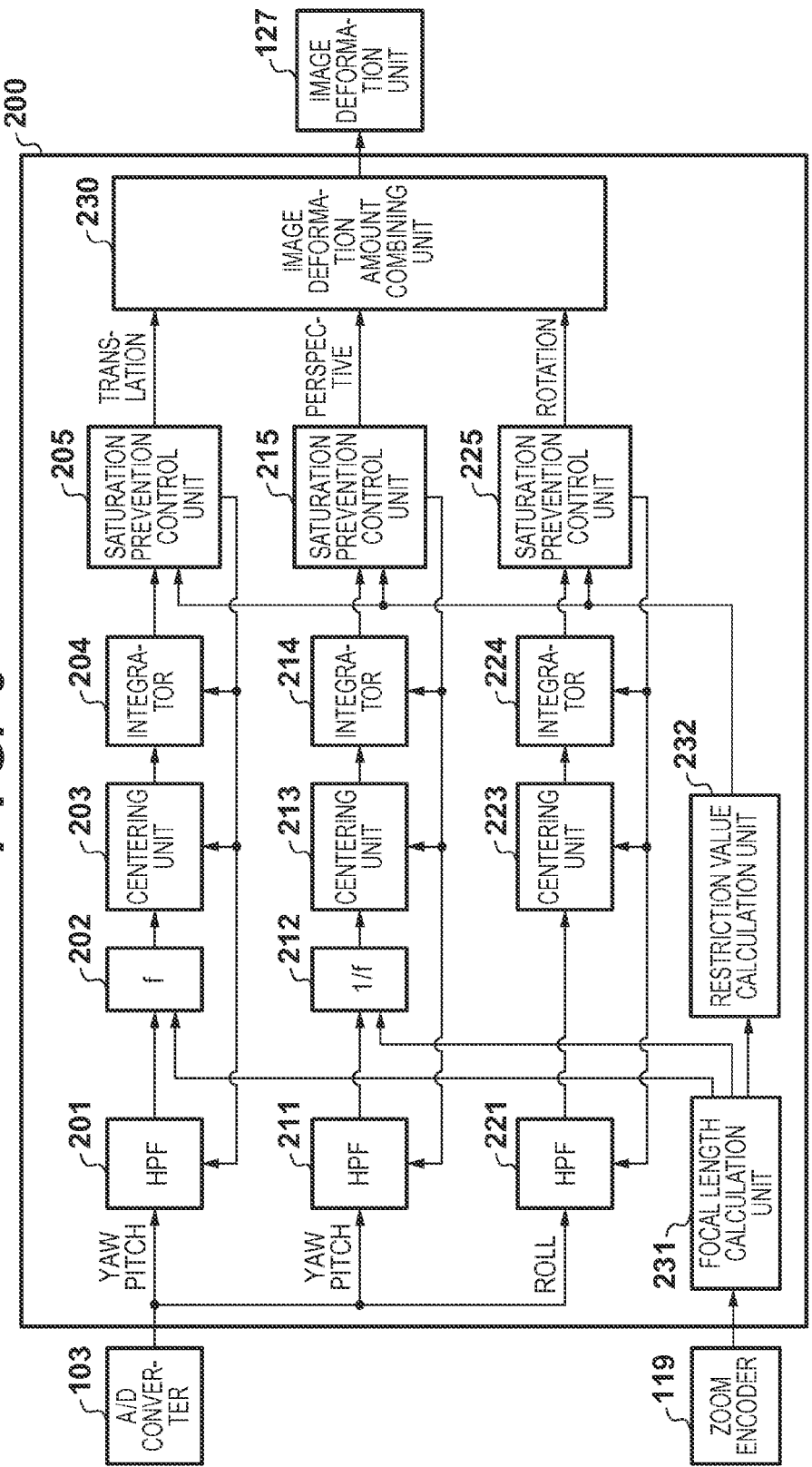
FIG. 3 is a block diagram showing an example of the arrangement of an image deformation amount calculation unit in the first embodiment.

In the block diagram of FIG. 3, blocks (translation correction amount calculation unit) 201 to 205 are used to calculate a correction amount for correcting translation image blurring (image blurring caused by the translation component of a shake). Blocks 211 to 215 are used to calculate a correction amount for correcting perspective image blurring (image blurring caused by the perspective component of the shake). Blocks (rotation correction amount calculation unit) 221 to 225 are used to calculate a correction amount for correcting rotational image blurring (image blurring caused by the rotation component of the shake).

The blocks 201 to 205 used to calculate the correction amount of translation image blurring (image blurring caused by the translation component of the shake) will be described first.

Among outputs from the above-described A/D converter 103, angular velocity data in the yaw or pitch direction is supplied to the HPF 201 (high-pass filter). The HPF 201 has a function capable of changing its characteristic in an arbitrary frequency band. The HPF 201 outputs a signal in a high frequency band by cutting off low frequency components contained in the angular velocity data. Note that the HPF 201 is not essential in this embodiment, and an output from the A/D converter 103 may be directly supplied to the focal length multiplication unit 202.

A focal length calculation unit 231 calculates the focal length of the imaging optical system 120 based on an output from the above-described zoom encoder 119, and sets a focal length used for calculation by the focal length multiplication unit 202 and focal length division unit 212. The focal length multiplication unit 202 multiplies an output from the HPF 201 by the focal length f calculated by the focal length calculation unit 231, and then supplies the result to the centering unit 203.

When panning or a rotational shake which is too large to be corrected by image stabilization is generated in the yaw or pitch direction of the image capturing apparatus 100, the centering unit 203 adds an input value (to be referred to as a centering amount hereinafter) to an output from the focal length multiplication unit 202 so as to return the correction amount to zero. Note that the centering unit 203 is not essential in this embodiment, and an output from the focal length multiplication unit 202 may be directly supplied to the integrator 204.

The integrator 204 has a function capable of changing its characteristic in an arbitrary frequency band. The integrator 204 integrates an output from the centering unit 203, and supplies the result to the saturation prevention control unit 205.

A restriction value calculation unit 232 calculates restriction values for the respective deformation components in accordance with the focal length f calculated by the focal length calculation unit 231, and supplies them to the saturation prevention control units 205, 215, and 225 corresponding to the respective deformation components.

The saturation prevention control unit 205 controls to restrict the magnitude of an output from the integrator 204 to a value smaller than a predetermined restriction value (to be referred to as a limit value hereinafter) output from the restriction value calculation unit 232. When the magnitude of an output from the integrator 204 comes close to the limit value, the saturation prevention control unit 205 controls to, for example, change the cutoff frequency of the HPF 201 toward the high frequency side, shorten the time constant of the integrator 204, or increase the centering amount of the centering unit 203. By this control, the magnitude of an output from the integrator 204 hardly reaches the limit value, and the tracking property of image stabilization to a shake can be lessened. An output from the saturation prevention control unit 205 serves as a final translation correction amount and is supplied to an image deformation amount combining unit 230.

The blocks 211 to 215 used to calculate the correction amount of perspective image blurring (image blurring caused by the perspective component of the shake) will be described next. The blocks 211 to 215 execute the same processes as those of the blocks 201 to 205 except for processes by the focal length multiplication unit 202 and focal length division unit 212. Only the focal length division unit 212 will thus be explained, and a description of the remaining blocks will be omitted.

The focal length division unit 212 divides an output from the HPF 211 by the focal length f calculated by the focal length calculation unit 231, and supplies the result to the centering unit 213. Division by the focal length f is performed according to equations (25) and (26) for perspective. An output from the saturation prevention control unit 215 serves as a final perspective correction amount and is supplied to the image deformation amount combining unit 230.

The blocks 221 to 225 used to calculate the correction amount of rotational image blurring (image blurring caused by the rotation component of the shake) will be explained next.

Among outputs from the above-described A/D converter 103, angular velocity data in the roll direction is supplied to the HPF 221. The HPF 221 has a function capable of changing its characteristic in an arbitrary frequency band. The HPF 221 outputs a signal in a high frequency band by cutting off low frequency components contained in the angular velocity data. Note that the HPF 221 is not essential in this embodiment, and an output from the A/D converter 103 may be directly supplied to the centering unit 223.

When a rotational shake which is too large to be corrected is generated in the roll direction of the image capturing apparatus 100, the centering unit 223 adds a centering amount to an output from the HPF 221, similarly to the centering units 203 and 213. Note that the centering unit 223 is not essential in this embodiment, and an output from the HPF 221 or A/D converter 103 may be directly supplied to the integrator 224.

The integrator 224 has a function capable of changing its characteristic in an arbitrary frequency band. The integrator 224 integrates an output from the centering unit 223, and supplies the result to the saturation prevention control unit 225.

The saturation prevention control unit 225 controls to restrict an output from the integrator 224 to a value smaller than a predetermined limit value output from the restriction value calculation unit 232. When an output from the integrator 224 comes close to the limit value, the saturation prevention control unit 225 controls to, for example, change the cutoff frequency of the HPF 221 toward the high frequency side, shorten the time constant of the integrator 224, or increase the centering amount of the centering unit 223. By this control, the magnitude of an output from the integrator 204 hardly reaches the limit value, and the tracking property of image stabilization to a shake can be lessened. An output from the saturation prevention control unit 225 serves as a final rotation correction amount and is supplied to the image deformation amount combining unit 230.

The image deformation amount combining unit 230 performs calculation to combine the translation correction amount, perspective correction amount, and rotation correction amount output from the saturation prevention control units 205, 215, and 225, respectively. More specifically, the projective transformation matrix in expression (1) is calculated according to equation (13). At this time, assume that the enlargement/reduction and shear deformation amounts have values represented by equations (27), (28), and (29), respectively. The image deformation amount combining unit 230 outputs the value of each element of the calculated projective transformation matrix to the image deformation unit 127. The image deformation unit 127 performs image stabilization by image deformation based on an output from the image deformation amount combining unit 230.

Next, the restriction value calculation unit 232 will be explained in more detail. To electronically correct image blurring by image deformation, it is necessary to ensure extra pixels for each deformation in accordance with the size of an output image. Here, attention is paid to the respective deformation components. As represented by equations (14) to (21) or equations (22) to (29), a correction amount for correcting translation image blurring increases toward the telephoto-side in proportion to the focal length. In contrast, a correction amount for correcting perspective image blurring decreases toward the telephoto-side in inverse proportion to the focal length. A correction amount for correcting rotational image blurring has a value independent of the focal length. In practice, however, the image capturing range is narrowed toward the telephoto-side, so it can be said that the influence of rotational image blurring decreases toward the telephoto-side.

The number of extra pixels which can be ensured for image deformation is finite. The extra pixels are determined by input and output image sizes determined by the image sensor. From this, the restriction values, that is, limit values of correction amounts necessary for the respective deformation components, which are calculated by the restriction value calculation unit 232, are distributed in accordance with the focal length by taking account of the aforementioned relationship. Even if the input image size is large and a sufficient number of extra pixels can be ensured, predetermined limit values are desirably set for the correction amounts of the respective deformation components not to perform correction exceeding the limit values, in order to maintain the smoothness of an image in camera work (camera operation such as panning) by a user.

To correct image blurring, it is most important to correct translation image blurring rather than perspective image blurring and rotational image blurring. However, the correction amount of translation image blurring increases as the focal length comes close to the telephoto-side, as described above. In this embodiment, the limit values of the correction amounts assigned to perspective image blurring and rotational image blurring are reduced for the correction amount of translation image blurring more necessary on the telephoto-side, and the margin is assigned to increase the limit value of the correction amount of translation image blurring. That is, when the zoom position is on the telephoto-side, the correctable amounts of perspective image blurring and rotational image blurring decrease and that of translation image blurring increases, compared to the case in which the zoom position is on the wide angle side.

Figure 4A:
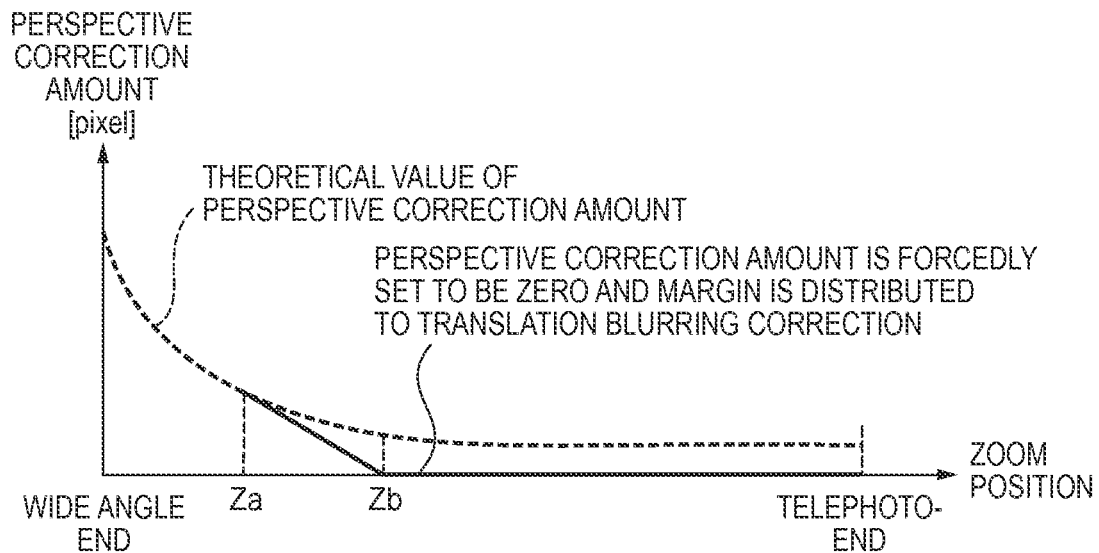
FIGS. 4A and 4B are graphs showing a concept of a correction amount limit value setting method in the first embodiment.
Figure 4B:
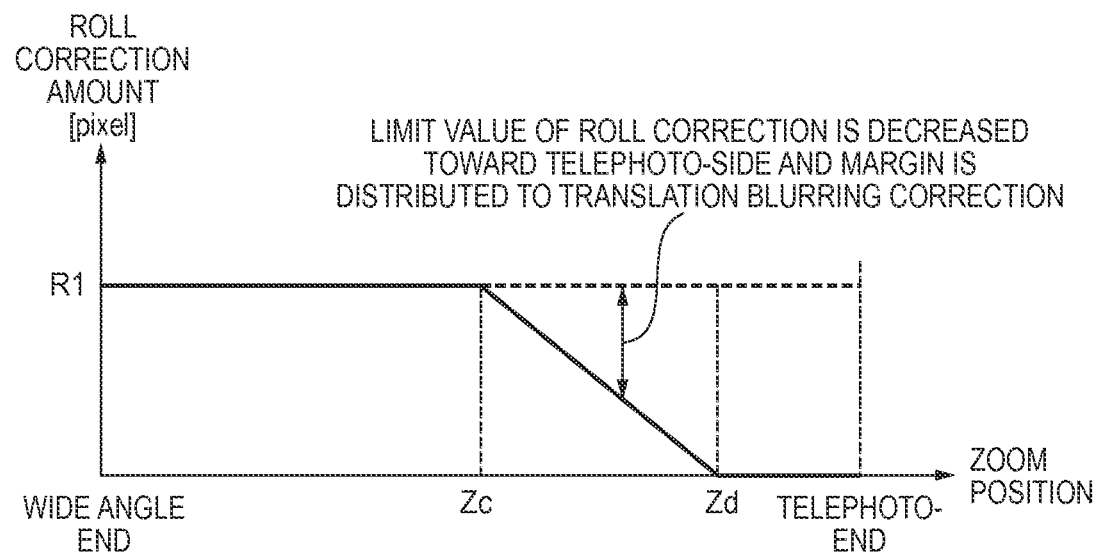

FIGS. 4A and 4B are graphs showing an example of the correction amount limit value setting method. FIG. 4A shows setting of the limit value of the correction amount of perspective image blurring. A dotted line indicates the theoretical value of the correction amount of perspective image blurring. Although a small perspective remains even on the telephoto-side in theory, perspective image blurring generated on the telephoto-side hardly stands out, compared to that on the wide angle side. Considering this, as indicated by a solid line, the theoretical value is adopted as the limit value from the wide angle end to a zoom position Za. From a zoom position Zb to the telephoto-end, the limit value is set to be zero or very small. In an interval between the zoom positions Za and Zb, the limit value is set by connecting these limit values corresponding to the zoom positions Za and Zb. Note that the zoom position Zb is set on the telephoto-side from the zoom position Za.

When the limit value of the correction amount of perspective image blurring is set in this manner, perspective image blurring can be corrected on the wide angle side where perspective image blurring is greatly generated. On the telephoto-side, however, extra pixels for correcting perspective image blurring become unnecessary or only a small number of extra pixels are necessary, and these extra pixels can be assigned to the correction amount of translation image blurring. More specifically, extra pixels to be assigned to the limit value of the correction amount of perspective image blurring, that is, a difference value between the dotted line and the solid line in FIG. 4A is added to the limit value of the correction amount of translation image blurring to increase the limit value by this difference. Accordingly, a large correction amount of translation image blurring can be ensured on the telephoto-side.

As the method of changing the limit value of the correction amount of perspective image blurring, the limit values corresponding to Za and Zb are connected by a straight line in the above description, but may be connected by a curve using these two points as inflection points. Alternatively, Za and Zb may have the same value, and the limit value may be changed to be zero instantaneously at a given zoom position.

If the telephoto-end is set as the Za and Zb values, this means that a theoretical value is used as the limit value from the wide angle end to the telephoto-end. If the wide angle end is set as the Za and Zb values, this means that limit values from the wide angle end to the telephoto-end become zero or very small, and that perspective image blurring is not corrected or is corrected only slightly. That is, the restriction value of the correction amount of perspective image blurring can be set by setting arbitrary values as Za and Zb from the wide angle end to the telephoto-end.

FIG. 4B shows setting of the limit value of the correction amount of rotational image blurring. A correction amount R1 is a theoretical value necessary to correct rotational image blurring. The limit value of the correction amount of rotational image blurring is set, as represented by a solid line. More specifically, the theoretical value R1 is set as the limit value from the wide angle end to a zoom position Zc. From a zoom position Zd to the telephoto-end, the limit value is set to be zero or very small. In an interval between the zoom positions Zc and Zd, the limit value is set by connecting these limit values corresponding to the zoom positions Zc and Zd. Note that Zd is set on the telephoto-side from Zc.

When the limit value of the correction amount of rotational image blurring is set in this fashion, rotational image blurring can be corrected on the wide angle side where rotational image blurring stands out. On the telephoto-side, however, extra pixels for correcting rotational image blurring become unnecessary and can be assigned to the correction amount of translation image blurring. More specifically, extra pixels to be assigned to the limit value of the correction amount of rotational image blurring, that is, a difference value between the dotted line and the solid line in FIG. 4B is added to the limit value of the correction amount of translation image blurring to increase the limit value by this difference. Therefore, a large correction amount of translation image blurring can be ensured on the telephoto-side.

As the method of changing the limit value of the correction amount of rotational image blurring, the limit values corresponding to Zc and Zd are connected by a straight line in the above description, but may be connected by a curve using these two points as inflection points. Alternatively, Zc and Zd may have the same value, and the limit value may be changed to be zero or very small instantaneously at a given zoom position.

If the telephoto-end is set as the Zc and Zd values, this means that a theoretical value is used as the limit value from the wide angle end to the telephoto-end. If the wide angle end is set as the Zc and Zd values, this means that limit values from the wide angle end to the telephoto-end become zero or very small, and that rotational image blurring is not corrected or is corrected only slightly. That is, the restriction value of the correction amount of rotational image blurring can be set by setting arbitrary values as Zc and Zd from the wide angle end to the telephoto-end.

The limit values of both perspective image blurring correction and rotational image blurring correction may be set to be zero or very small on the telephoto-side, and extra pixels of them may be assigned to the limit value of the correction amount of translation image blurring. Alternatively, only either limit value may be set to be zero or very small on the telephoto-side, and extra pixels of it may be assigned to the limit value of the correction amount of translation image blurring.

The restriction value calculation unit 232 sets the limit values of perspective image blurring, rotational image blurring, and translation image blurring in accordance with the focal length f calculated by the focal length calculation unit 231 in the above-described way, and outputs them to the saturation prevention control units 205, 215, and 225, respectively. Note that each limit value may be calculated based on an arithmetic expression using the focal length. It is also possible to store each limit value in a memory as table data for each focal length, and read out a value from the table data in accordance with focal length information. Even when reading out a value from the table data, only discrete data may be stored and a value between these data may be calculated by interpolation.

As described above, in the first embodiment of the present invention, the limit values of the correction amounts of perspective image blurring and rotational image blurring are set to be small on the telephoto-side of the focal length to distribute extra pixels necessary for correction to the correction amount of translation image blurring. Hence, a finite number of extra pixels can be efficiently used to correct each image blurring, implementing effective image stabilization.

Second Embodiment

Figure 5:
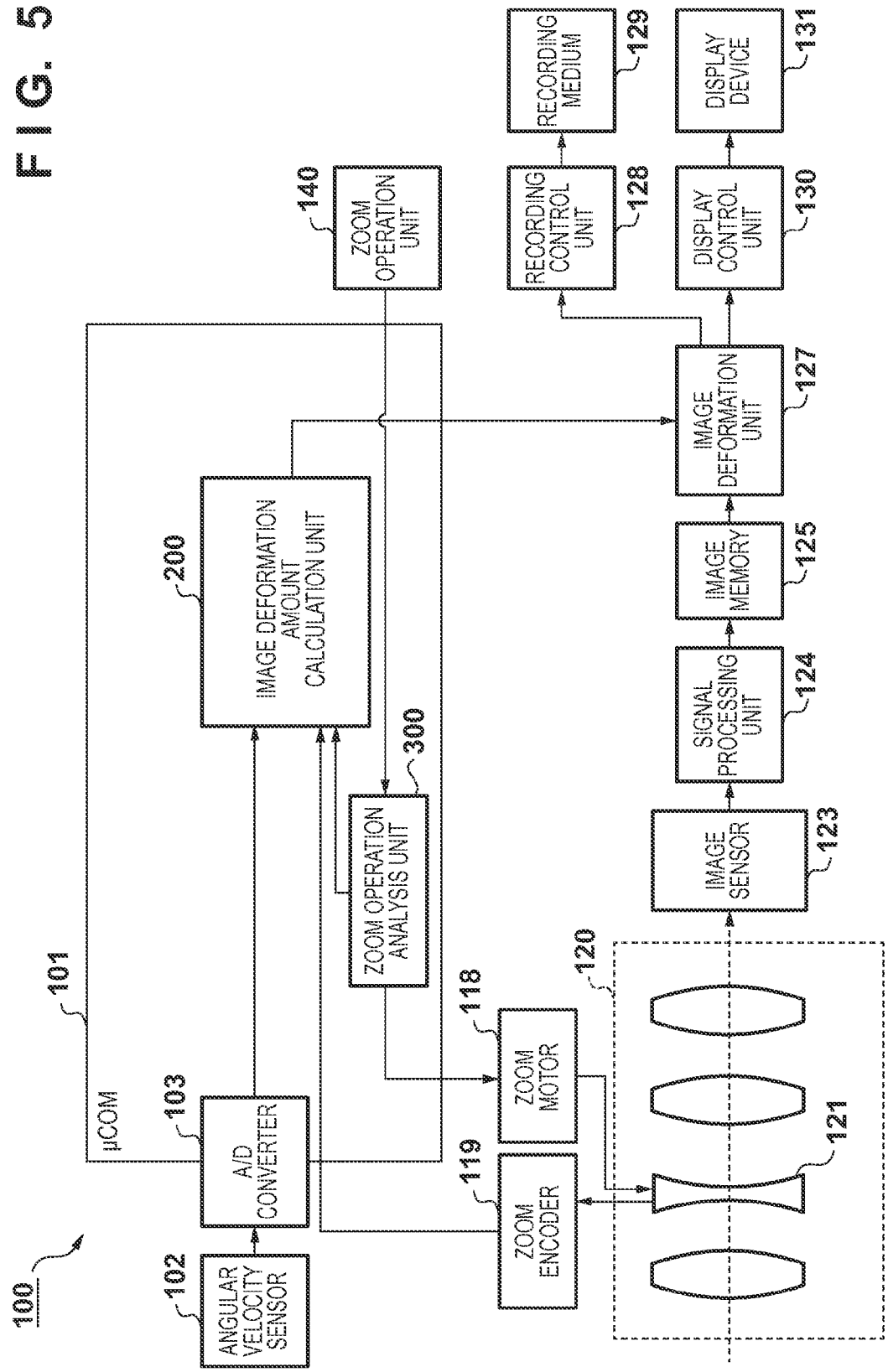
FIG. 5 is a block diagram showing an example of the arrangement of a video camera as an example of an image capturing apparatus in the second embodiment.

The second embodiment of the present invention will be described next. FIG. 5 is a block diagram showing the arrangement of an image capturing apparatus according to the second embodiment. In FIG. 5, the same reference numerals as those of the image capturing apparatus 100 shown in FIG. 1 denote the same parts and a description thereof will not be repeated. FIG. 5 shows an arrangement in which the following blocks are added to the arrangement of FIG. 1.

A zoom operation unit 140 is an interface used by a user to perform a zoom operation in an image capturing apparatus 100. Operation information input by the user via the zoom operation unit 140 is supplied to a zoom operation analysis unit 300 in a μCOM 101. The zoom operation unit 140 includes, for example, a zoom switch to be operated using a see-saw key, slide key, or the like, and a zoom operation on a touch panel or the like.

The zoom operation analysis unit 300 analyzes the operation information input via the zoom operation unit 140, and determines the presence/absence of the zoom operation and an operation direction (zooming toward the telephoto-side or zooming toward the wide angle side). Based on the determination result, the zoom operation analysis unit 300 outputs a zoom operation state to an image deformation amount calculation unit 200, and outputs a driving instruction to a zoom motor 118 via a PWM output (not shown) or the like. The zoom motor 118 drives a zoom optical system 121 in accordance with the driving instruction from the zoom operation analysis unit 300.

Figure 6:
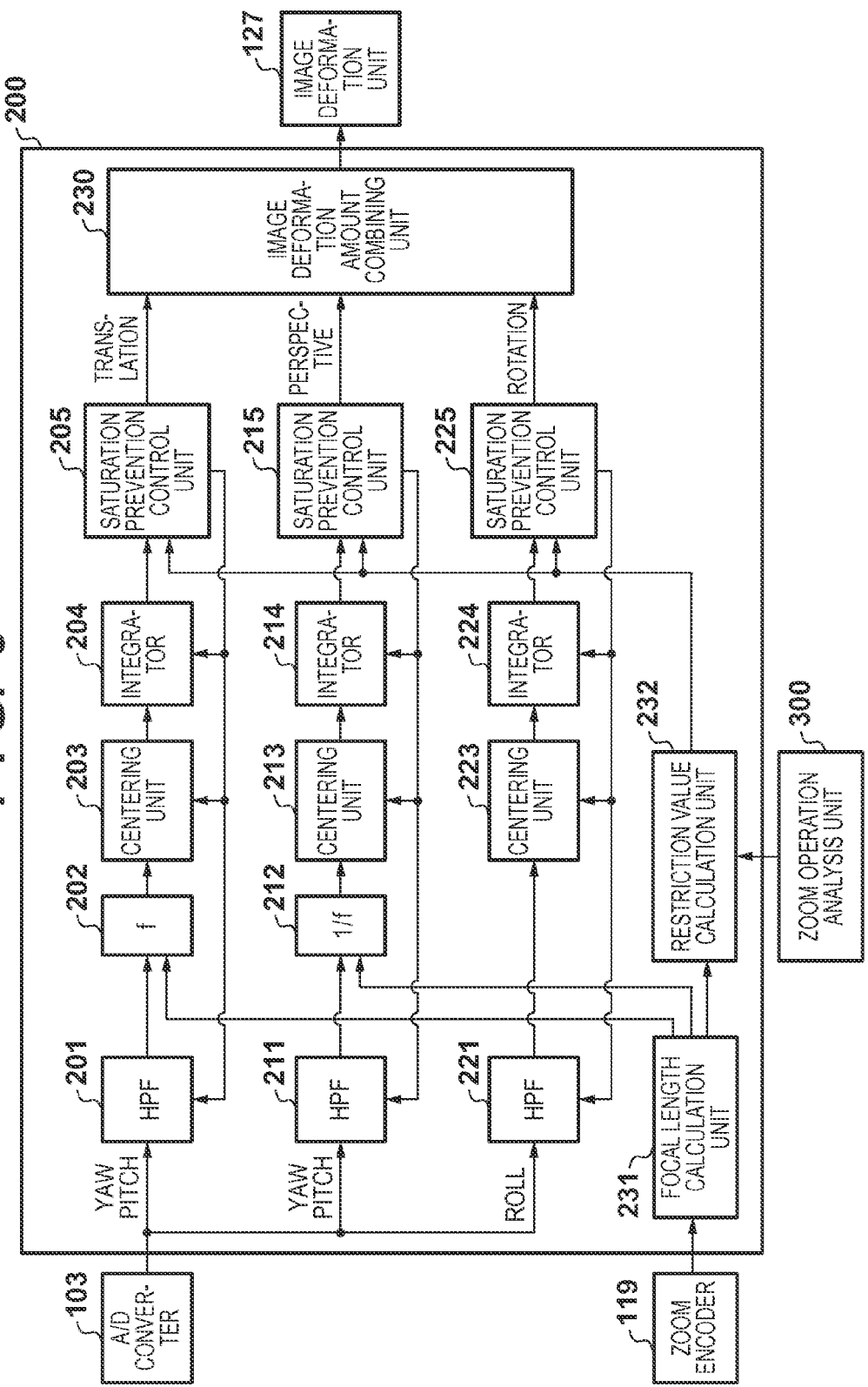
FIG. 6 is a block diagram showing an example of the arrangement of an image deformation amount calculation unit in the second embodiment.

The arrangement of the image deformation amount calculation unit 200 in this embodiment will be explained with reference to the block diagram of FIG. 6. In FIG. 6, the same reference numerals as those in the block diagram shown in FIG. 3 denote the same parts and a description thereof will not be repeated. FIG. 6 shows an arrangement in which input of information from the zoom operation analysis unit 300 is added to the arrangement of FIG. 3.

As described above, the zoom operation analysis unit 300 determines the presence/absence of the zoom operation and an operation direction (zooming toward the telephoto-side or zooming toward the wide angle side), and supplies the determination result to a restriction value calculation unit 232. The restriction value calculation unit 232 decides the restriction values of correction amounts in accordance with the zoom operation state from the zoom operation analysis unit 300, and outputs them to saturation prevention control units 205, 215, and 225, respectively.

Figure 7:
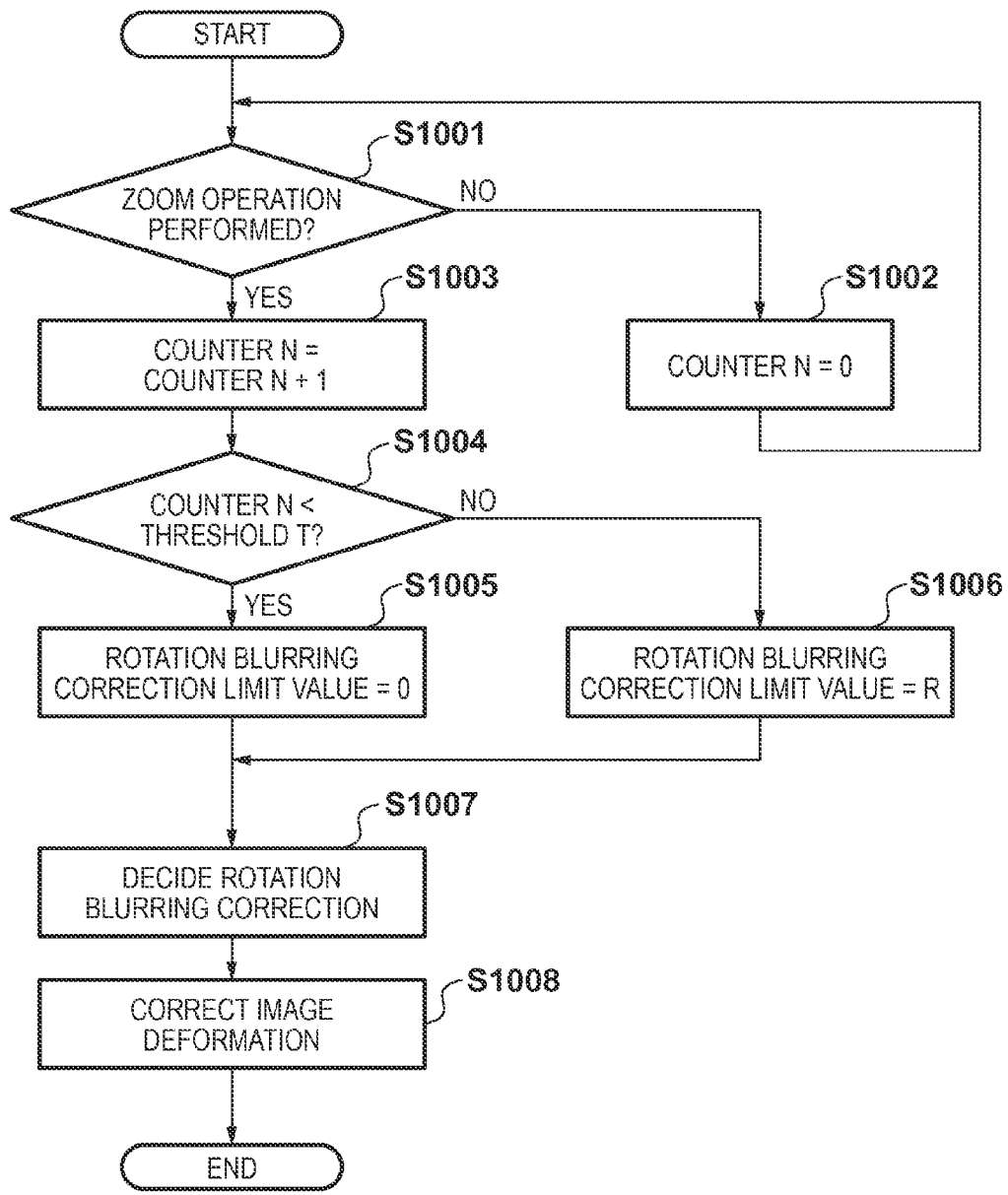
FIG. 7 is a flowchart showing control by the image deformation amount calculation unit in the second embodiment.

The operation of the restriction value calculation unit 232 will be explained in detail below. FIG. 7 is a flowchart showing processing by the μCOM 101 in this embodiment. Note that the processing shown in FIG. 7 is repetitively executed in a predetermined arbitrary cycle, for example, a capturing cycle of 60 Hz for an image of one frame in the image capturing apparatus.

In step S1001, the zoom operation analysis unit 300 determines the presence/absence of a zoom operation. If the zoom operation has been performed, the process advances to step S1003; if no zoom operation has been performed, to step S1002. In step S1002, a counter N for counting the time after the start of the zoom operation is cleared, and the process returns to step S1001. In step S1003, the counter N for counting the time after the start of the zoom operation is incremented, and the process advances to step S1004. In step S1004, it is determined whether the counter N is smaller than a predetermined threshold T (predetermined period immediately after the zoom operation was performed). If N<T, the predetermined period has not elapsed immediately after the zoom operation was performed, and the process advances to step S1005. If N≥T, the predetermined period has elapsed immediately after the zoom operation was performed, and the process advances to step S1006.

In step S1005, the restriction value calculation unit 232 sets the limit value of the correction amount of rotational image blurring to be zero, and the process advances to step S1007. In step S1006, the restriction value calculation unit 232 sets the limit value of the correction amount of rotational image blurring to be an arbitrary value R, and the process advances to step S1007. In step S1007, the saturation prevention control unit 225 decides the correction amount of rotational image blurring based on the limit value set in step S1005 or S1006, and the process advances to step S1008. In step S1008, the image deformation amount is calculated based on the correction amount of rotational image blurring decided in step S1007, and an image is deformed.

As described above, in the second embodiment of the present invention, when the user performs a zoom operation, the limit value of the correction amount of rotational image blurring is set to be zero or very small during the predetermined period T immediately after the zoom operation was performed, so as not to correct the rotational image blurring. Thus, even if the zoom operation by the user generates a large amount of rotational image blurring unintentionally, the rotational image blurring is not forcedly corrected, preventing a failure to correct translation image blurring and perspective image blurring. By efficiently using a finite number of extra pixels, effective image stabilization can be implemented.

Third Embodiment

The third embodiment will be described. Block diagrams showing the arrangement of an image capturing apparatus in this embodiment are the same as FIGS. 5 and 6 except for processing in a µCOM 101, and a description of the block diagrams will not be repeated.

Figure 8:
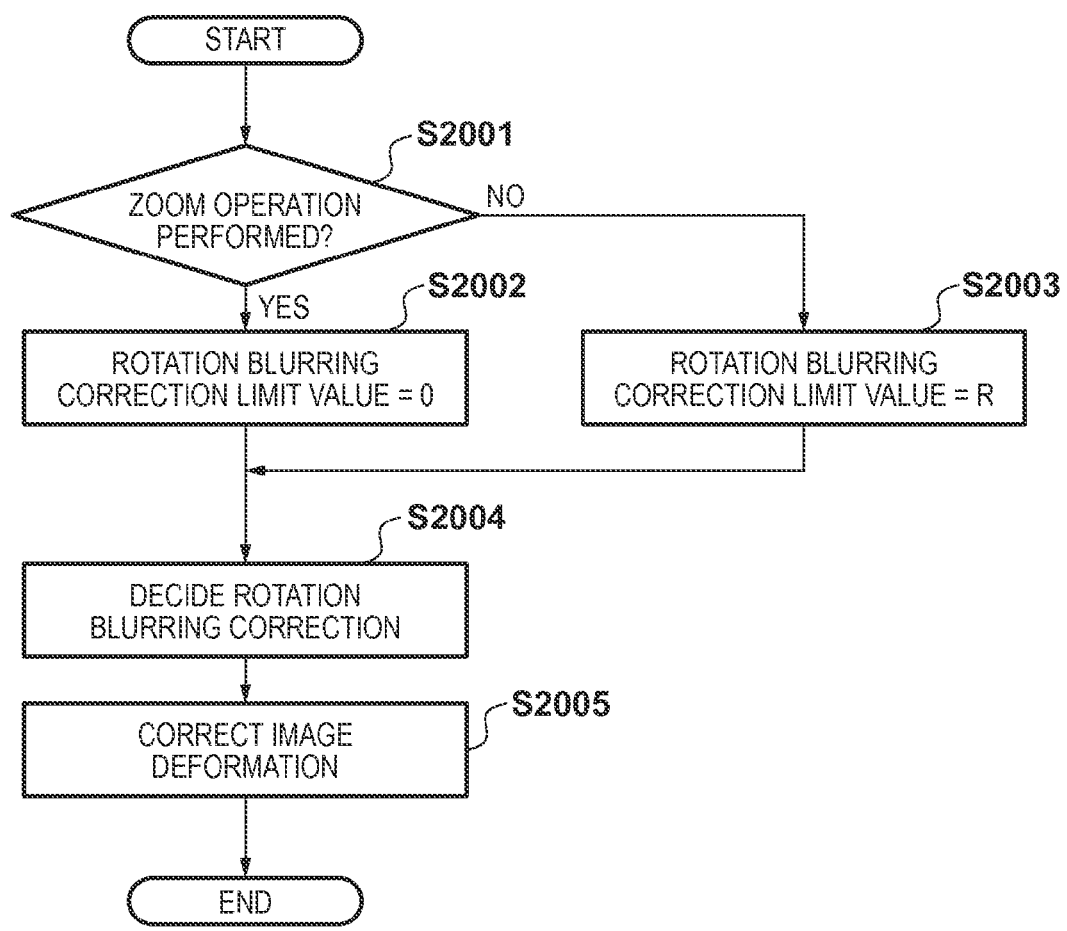
FIG. 8 is a flowchart showing control by an image deformation amount calculation unit in the third embodiment.

FIG. 8 is a flowchart showing processing by the µCOM 101 in this embodiment. Note that the processing shown in FIG. 8 is repetitively executed in a predetermined arbitrary cycle, for example, a capturing cycle of 60 Hz for an image of one frame in the image capturing apparatus.

In step S2001, a zoom operation analysis unit 300 determines the presence/absence of a zoom operation. If the zoom operation has been performed, the process advances to step S2002; if no zoom operation has been performed, to step S2003. In step S2002, a restriction value calculation unit 232 sets the limit value of the correction amount of rotational image blurring to be zero or very small, and the process advances to step S2004. In step S2003, the restriction value calculation unit 232 sets the limit value of the correction amount of rotational image blurring to be an arbitrary value R, and the process advances to step S2004. In step S2004, a saturation prevention control unit 225 decides the correction amount of rotational image blurring based on the limit value set in step S2002 or S2003, and the process advances to step S2005. In step S2005, the image deformation amount is calculated based on the correction amount of rotational image blurring decided in step S2004, and an image is deformed.

As described above, in the third embodiment of the present invention, when the user performs a zoom operation, the limit value of the correction amount of rotational image blurring is set to be zero or very small during the zoom operation, so as not to correct the rotational image blurring. It can therefore be prevented to suddenly correct rotational image blurring or stop the correction during the zoom operation by the user. By efficiently using a finite number of extra pixels, effective image stabilization can be implemented.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-286168, filed Dec. 27, 2012, which is hereby incorporated by reference herein in its entirety.

What is claimed is:

1. An image capturing apparatus for correcting image blurring of a captured image, comprising:
    an image capturing unit configured to capture an image;
    a focal length detection unit configured to detect information of a focal length of an optical system;
    a shake detection unit configured to detect a shake;
    a correction amount calculation unit configured to calculate, based on an output from the shake detection unit, a correction amount for correcting a translational motion component of the image blurring of the captured image, and a correction amount for correcting a rotation component of the image blurring of the captured image;
    an image stabilization unit configured to correct the image blurring of the captured image based on the correction amount for correcting the translational motion component of the image blurring of the captured image, the correction amount for correcting the rotation component of the image blurring of the captured image, and the correction amount for correcting the perspective component of the image blurring of the captured image; and
    a control unit configured to decrease the correction amount for correcting the rotation component of the image blurring of the captured image and the correction amount for correcting the perspective component of the image blurring of the captured image on a telephoto-side of the focal length, compared to a wide angle side of the focal length, and increase the correction amount for correcting the translational motion component of the image blurring of the captured image on the telephoto-side of the focal length, compared to the wide angle side of the focal length.

2. The apparatus according to claim 1, wherein the shake detection unit detects a shake in a first direction on a plane perpendicular to an optical axis of the image capturing apparatus, a shake in a second direction on the plane that is perpendicular to the first direction, and a shake in a third direction parallel to the optical axis, and wherein the correction amount calculation unit includes:
a translation correction amount calculation unit that calculates the correction amount for correcting the translational motion component of the image blurring of the captured image based on outputs from the shake detection unit for the shake in the first direction and the shake in the second direction;
a rotation correction amount calculation unit that calculates the correction amount for correcting the rotation component of the image blurring of the captured image based on an output from the shake detection unit for the shake in the third direction; and
a perspective correction amount calculation unit that calculates, based on the outputs from the shake detection unit for the shake in the first direction and the shake in the second direction, the correction amount for correcting the perspective component of the image blurring of the captured image.

3. The apparatus according to claim 2, wherein the control unit, based on focal length information from the focal length detection unit, decreases the correction amounts calculated by the rotation correction amount calculation unit and the perspective correction amount calculation unit, and increases the correction amount calculated by the translation correction amount calculation unit.

4. The apparatus according to claim 3, wherein the control unit, as the focal length comes close to the telephoto-side, decreases the correction amounts calculated by the rotation correction amount calculation unit and the perspective correction amount calculation unit, and increases, in accordance with a margin generated by decreasing the correction amounts, the correction amount calculated by the translation correction amount calculation unit.

5. The apparatus according to claim 3, wherein the control unit sets the correction amounts calculated by the rotation correction amount calculation unit and the perspective correction amount calculation unit to zero or very small on the telephoto-side of the focal length information with respect to a predetermined focal length.

6. The apparatus according to claim 3, further comprising a zoom operation unit configured to perform a zoom operation by moving a zoom lens,
wherein the control unit sets the correction amount calculated by the rotation correction amount calculation unit to zero or very small during a predetermined period immediately after the zoom operation unit is operated.

7. The apparatus according to claim 3, further comprising a zoom operation unit configured to perform a zoom operation,
wherein the control unit sets the correction amount calculated by the rotation correction amount calculation unit to zero while the zoom operation unit is operated.

8. A method for correcting image blurring of a captured image, comprising:
capturing an image;
detecting information of a focal length of an optical system;
detecting a shake;
calculating, based on the detected shake, a correction amount for correcting a translational motion component of the image blurring of the captured image, a correction amount for correcting a rotation component of the image blurring of the captured image, and a correction amount for correcting a perspective component of the image blurring of the captured image;
correcting the image blurring of the captured image based on the correction amount for correcting the translational motion component of the image blurring of the captured image, the correction amount for correcting the rotation component of the image blurring of the captured image, and the correction amount for correcting the perspective component of the image blurring of the captured image;
decreasing the correction amount for correcting the rotation component of the image blurring of the captured image and the correction amount for correcting the perspective component of the image blurring of the captured image on a telephoto-side of the focal length, compared to a wide angle side of the focal length; and
increasing the correction amount for correcting the translational motion component of the image blurring of the captured image on the telephoto-side of the focal length, compared to the wide angle side of the focal length.

9. A non-transitory computer-readable storage medium storing a program for causing a computer to execute a method for correcting image blurring of a captured image, comprising:
capturing an image;
detecting information of a focal length of an optical system;
detecting a shake;
calculating, based on the detected shake, a correction amount for correcting a translational motion component of the image blurring of the captured image, a correction amount for correcting a rotation component of the image blurring of the captured image, and a correction amount for correcting a perspective component of the image blurring of the captured image;
correcting the image blurring of the captured image based on the correction amount for correcting the translational motion component of the image blurring of the captured image, the correction amount for correcting the rotational component of the image blurring of the captured image, and the correction amount for correcting the perspective component of the image blurring of the captured image;
decreasing the correction amount for correcting the rotation component of the image blurring of the captured image and the correction amount for correcting the perspective component of the image blurring of the captured image on a telephoto-side of the focal length, compared to a wide angle side of the focal length; and
increasing the correction amount for correcting the translational motion component of the image blurring of the captured image on the telephoto-side of the focal length, compared to the wide angle side of the focal length.

10. An image capturing apparatus for correcting image blurring of a captured image, comprising:
an image capturing unit configured to capture an image;
a correction amount calculation unit configured to receive a detected shake signal and calculate, based on a detected shake in a detected shake signal, a correction amount for correcting a translational motion component of the image blurring of the captured image, a correction amount for correcting a rotation component of the image blurring of the captured image, and a correction amount for correcting a perspective component of the image blurring of the captured image;

an image stabilization control unit configured to generate a control signal to correct the image blurring of the captured image based on the correction amount for correcting the translational motion component of the image blurring of the captured image, the correction amount for correcting the rotation component of the image blurring of the captured image, and the correction amount for correcting the perspective component of the image blurring of the captured image; and a correction unit configured to decrease the correction amount for correcting the rotation component of the image blurring of the captured image and the correction amount for correcting the perspective component of the image blurring of the captured image on a telephoto-side of a focal length of an optical system, compared to a wide angle side of the focal length, and increase the correction amount for correcting the translational motion component of the image blurring of the captured image on the telephoto-side of the focal length of the optical system, compared to the wide angle side of the focal length.

11. The apparatus according to claim 10, wherein a detected shake includes a shake in a first direction on a plane perpendicular to an optical axis of the image capturing apparatus, a shake in a second direction on the plane that is perpendicular to the first direction, and a shake in a third direction parallel to the optical axis, and wherein the correction amount calculation unit includes:

a translation correction amount calculation unit that calculates the correction amount for correcting the translational motion component of the image blurring of the captured image based on the shake in the first direction and the shake in the second direction;

a rotation correction amount calculation unit that calculates the correction amount for correcting the rotation component of the image blurring of the captured image based on the shake in the third direction; and a perspective correction amount calculation unit that calculates, based on the shake in the first direction and the shake in the second direction, the correction amount for correcting the perspective component of the image blurring of the captured image.

12. The apparatus according to claim 11, wherein the correction unit, based on focal length information, decreases the correction amounts calculated by the rotation correction amount calculation unit and the perspective correction amount calculation unit, and increases the correction amount calculated by the translation correction amount calculation unit.

13. The apparatus according to claim 12, wherein the correction unit, as the focal length comes close to the telephoto-side, decreases the correction amounts calculated by the rotation correction amount calculation unit and the perspective correction amount calculation unit, and increases, in accordance with a margin generated by decreasing the correction amounts, the correction amount calculated by the translation correction amount calculation unit.

14. The apparatus according to claim 12, wherein the correction unit sets the correction amounts calculated by the rotation correction amount calculation unit and the perspective correction amount calculation unit to zero or very small on the telephoto-side of the focal length information with respect to a predetermined focal length.

15. The apparatus according to claim 12, further comprising a zoom operation unit configured to perform a zoom operation by moving a zoom lens, wherein the correction unit sets the correction amount calculated by the rotation correction amount calculation unit to zero or very small during a predetermined period immediately after the zoom operation unit is operated.

16. The apparatus according to claim 12, further comprising a zoom operation unit configured to perform a zoom operation, wherein the correction unit sets the correction amount calculated by the rotation correction amount calculation unit to zero while the zoom operation unit is operated.

17. A method for correcting image blurring of a captured image, comprising:

capturing an image;

receiving a detected shake signal;

calculating, based on a detected shake in a detected shake signal, a correction amount for correcting a translational motion component of the image blurring of the captured image, a correction amount for correcting a rotation component of the image blurring of the captured image, and a correction amount for correcting a perspective component of the image blurring of the captured image;

generating a control signal to correct the image blurring of the captured image based on the correction amount for correcting the translational motion component of the image blurring of the captured image, based on the correction amount for correcting the rotation component of the image blurring of the captured image, and based on the correction amount for correcting the perspective component of the image blurring of the captured image;

decreasing the correction amount for correcting the rotation component of the image blurring of the captured image and the correction amount for correcting the perspective component of the image blurring of the captured image on a telephoto-side of a focal length of an optical system, compared to a wide angle side of the focal length; and increasing the correction amount for correcting the translational motion component of the image blurring of the captured image on the telephoto-side of the focal length of the optical system, compared to the wide angle side of the focal length.

18. A non-transitory computer-readable storage medium storing a program for causing a computer to execute a method for correcting image blurring of a captured image, the method comprising:

capturing an image;

receiving a detected shake signal;

calculating, based on a detected shake in a detected shake signal, a correction amount for correcting a translational motion component of the image blurring of the captured image, a correction amount for correcting a rotation component of the image blurring of the captured image, and a correction amount for correcting a perspective component of the image blurring of the captured image;

generating a control signal to correct the image blurring of the captured image based on the correction amount for correcting the translational motion component of the image blurring of the captured image, based on the correction amount for correcting the rotation component of the image blurring of the captured image, and based on the correction amount for correcting the perspective component of the image blurring of the captured image;

decreasing the correction amount for correcting the rotation component of the image blurring of the captured image and the correction amount for correcting the perspective component of the image blurring of the captured image on a telephoto-side of a focal length of an optical system, compared to a wide angle side of the focal length; and increasing the correction amount for correcting the translational motion component of the image blurring of the captured image on the telephoto-side of the focal length of the optical system, compared to the wide angle side of the focal length.

19. An image capturing apparatus for correcting image blurring of a captured image, comprising:

an image capturing unit configured to capture an image;

a correction amount calculation unit configured to receive a detected shake signal and calculate, based on a detected shake in a detected shake signal, a correction amount for correcting a translational motion component of the image blurring of the captured image and a correction amount for correcting a perspective component of the image blurring of the captured image;

an image stabilization control unit configured to generate a control signal to correct the image blurring of the captured image based on the correction amount for correcting the translational motion component of the image blurring of the captured image and the correction amount for correcting the perspective component of the image blurring of the captured image; and a correction unit configured to decrease the correction amount for correcting the perspective component of the image blurring of the captured image on a telephoto-side of a focal length of an optical system, compared to a wide angle side of the focal length, and increase the correction amount for correcting the translational motion component of the image blurring of the captured image on the telephoto-side of the focal length of the optical system, compared to the wide angle side of the focal length.

20. An image capturing apparatus for correcting image blurring of a captured image, comprising:

an image capturing unit configured to capture an image;

a correction amount calculation unit configured to receive a detected shake signal and calculate, based on a detected shake in a detected shake signal, a correction amount for correcting a translational motion component of the image blurring of the captured image and a correction amount for correcting a rotation component of the image blurring of the captured image;

an image stabilization control unit configured to generate a control signal to correct the image blurring of the captured image based on the correction amount for correcting the translational motion component of the image blurring of the captured image and the correction amount for correcting the rotation component of the image blurring of the captured image;

a correction unit configured to decrease the correction amount for correcting the rotation component of the image blurring of the captured image on a telephoto-side of a focal length of an optical system, compared to a wide angle side of the focal length, and increase the correction amount for correcting the translational motion component of the image blurring of the captured image on the telephoto-side of the focal length of the optical system, compared to the wide angle side of the focal length.

21. A method for correcting image blurring of a captured image, comprising:

capturing an image;

receiving a detected shake signal;

calculating, based on a detected shake in a detected shake signal, a correction amount for correcting a translational motion component of the image blurring of the captured image and a correction amount for correcting a perspective component of the image blurring of the captured image;

generating a control signal to correct the image blurring of the captured image based on the correction amount for correcting the translational motion component of the image blurring of the captured image and the correction amount for correcting the perspective component of the image blurring of the captured image;

decreasing the correction amount for correcting the perspective component of the image blurring of the captured image on a telephoto-side of a focal length of an optical system, compared to a wide angle side of the focal length; and increasing the correction amount for correcting the translational motion component of the image blurring of the captured image on the telephoto-side of the focal length of the optical system, compared to the wide angle side of the focal length.

22. A method for correcting image blurring of a captured image, comprising:

capturing an image;

receiving a detected shake signal;

calculating, based on a detected shake in a detected shake signal, a correction amount for correcting a translational motion component of the image blurring of the captured image and a correction amount for correcting a rotation component of the image blurring of the captured image;

generating a control signal to correct the image blurring of the captured image based on the correction amount for correcting the translational motion component of the image blurring of the captured image and the correction amount for correcting the rotation component of the image blurring of the captured image;

decreasing the correction amount for correcting the rotation component of the image blurring of the captured image on a telephoto-side of a focal length of an optical system, compared to a wide angle side of the focal length; and increasing the correction amount for correcting the translation motion component of the image blurring of the captured image on the telephoto-side of the focal length of the optical system, compared to the wide angle side of the focal length.

23. An image capturing apparatus having a function for correcting image blurring of a captured image, comprising:

an image capturing unit configured to capture an image;

a correction amount calculation unit configured to calculate, based on an output of a shake detection unit, a correction amount for correcting a translational motion component of the image blurring of the captured image and a correction amount for correcting a perspective component of the image blurring of the captured image;

an image stabilization control unit configured to control an image stabilization unit to correct the image blurring of the captured image, based on the correction amount for correcting the translational motion component of the image blurring of the captured image and the correction amount for correcting the perspective component of the image blurring of the captured image; and a correction unit configured to decrease the correction amount for correcting the perspective component of the image blurring of the captured image when a focal length detected by a focal length detection unit, which detects information of the focal length of an optical system, is not less than a predetermined value compared when the focal length is smaller than the predetermined value, and increase the correction amount for correcting the translational motion component of the image blurring of the captured image when the focal length is not less than the predetermined value compared to when the focal length is smaller than the predetermined value.

24. An image capturing apparatus having a function for correcting image blurring of a captured image, comprising:
an image capturing unit configured to capture an image;
a correction amount calculation unit configured to calculate, based on an output of a shake detection unit, a correction amount for correcting a translational motion component of the image blurring of the captured image and a correction amount for correcting a rotation component of the image blurring of the captured image;
an image stabilization control unit configured to control an image stabilization unit to correct the image blurring of the captured image, based on the correction amount for correcting the translational motion component of the image blurring of the captured image and the correction amount for correcting the rotation component of the image blurring of the captured image; and
a correction unit configured to decrease the correction amount for correcting the rotation component of the image blurring of the captured image when a focal length detected by a focal length detection unit, which detects information of the focal length of an optical system, is not less than a predetermined value compared to when the focal length is smaller than the predetermined value, and increase the correction amount for correcting the translational motion component of the image blurring of the captured image when the focal length is not less than the predetermined value compared to the case that the focal length is smaller than the predetermined value.

25. A method for correcting image blurring of a captured image, comprising:
capturing an image;
calculating, based on an output of a shake detection unit, a correction amount for correcting a translational motion component of the image blurring of the captured image and a correction amount for correcting a perspective component of the image blurring of the captured image;
generating a control signal to correct the image blurring of the captured image, based on the correction amount for correcting the translational motion component of the image blurring of the captured image and the correction amount for correcting the perspective component of the image blurring of the captured image; and
decreasing the correction amount for correcting the perspective component of the image blurring of the captured image when a focal length detected by a focal length detection unit, which detects information of the focal length of an optical system, is not less than a predetermined value compared to when the focal length is smaller than the predetermined value; and
increasing the correction amount for correcting the translational motion component of the image blurring of the captured image when the focal length is not less than the predetermined value compared to when the focal length is smaller than the predetermined value.

26. A method for correcting image blurring of a captured image, comprising:
capturing an image;
calculating, based on an output of a shake detection unit, a correction amount for correcting a translational motion component of the image blurring of the captured image and a correction amount for correcting a rotation component of the image blurring of the captured image;
generating a control signal to correct the image blurring of the captured image, based on the correction amount for correcting the translational motion component of the image blurring of the captured image and the correction amount for correcting the rotation component of the image blurring of the captured image; and
decreasing the correction amount for correcting the rotation component of the image blurring of the captured image when a focal length detected by a focal length detection unit, which detects information of the focal length of an optical system, is not less than a predetermined value compared to when the focal length is smaller than the predetermined value; and
increasing the correction amount for correcting the translational motion component of the image blurring of the captured image when the focal length is not less than the predetermined value compared to when the focal length is smaller than the predetermined value.

* * * * *